United States Patent
Iwao et al.

(10) Patent No.: US 9,045,140 B2
(45) Date of Patent: Jun. 2, 2015

(54) COASTING CONTROL DEVICE

(75) Inventors: Nobuyuki Iwao, Fujisawa (JP); Yasushi Yamamoto, Fujisawa (JP); Kazuhiko Kobayashi, Yokohama (JP); Hiroyuki Arai, Yokohama (JP); Kouhei Takama, Yokohama (JP)

(73) Assignees: ISUZU MOTORS LIMITED, Tokyo (JP); TRANSTRON INC., Yokohama (JP)

( * ) Notice: Subject to any disclaimer, the term of this patent is extended or adjusted under 35 U.S.C. 154(b) by 154 days.

(21) Appl. No.: 13/812,935

(22) PCT Filed: Jul. 7, 2011

(86) PCT No.: PCT/JP2011/065564
§ 371 (c)(1),
(2), (4) Date: Jan. 29, 2013

(87) PCT Pub. No.: WO2012/014651
PCT Pub. Date: Feb. 2, 2012

(65) Prior Publication Data
US 2013/0138313 A1    May 30, 2013

(30) Foreign Application Priority Data
Jul. 30, 2010 (JP) .................. 2010-172561

(51) Int. Cl.
*B60W 10/02* (2006.01)
*B60W 30/18* (2012.01)
(Continued)

(52) U.S. Cl.
CPC .......... *B60W 30/18072* (2013.01); *B60T 8/172* (2013.01); *B60T 2201/09* (2013.01);
(Continued)

(58) Field of Classification Search
CPC ............... B60W 30/18072; B60W 40/068; B60W 10/02; B60W 10/06; B60W 2030/1809; B60T 8/172; B60T 8/1763; B60T 2201/09; B60T 2210/12; B60Y 2300/18083; F16D 2500/5085
USPC ............. 701/67, 93, 80, 71, 112; 477/47, 118
See application file for complete search history.

(56) References Cited

U.S. PATENT DOCUMENTS 5,056,637 A    10/1991    Miyawaki et al.
5,794,170 A *  8/1998    Kuroda et al. .................. 701/93
(Continued)

FOREIGN PATENT DOCUMENTS

JP    3-200433    9/1991
JP    8-67175     3/1996
(Continued)

OTHER PUBLICATIONS

Gustafsson, Monitoring Tire-Road Friction Using the Wheel Slip, Aug. 1998, Control Systems, IEEE, vol. 18, Issue 4.*
(Continued)

*Primary Examiner* — John Q Nguyen
*Assistant Examiner* — Nadeem Odeh
(74) *Attorney, Agent, or Firm* — Staas & Halsey LLP

(57) ABSTRACT

A coasting control device capable of avoiding coasting control during running on road having a small coefficient of friction between a tire and a road surface ("low μ roads") includes a low μ road running recognition unit which recognizes that a vehicle is running on a low μ road and a unit for prohibiting coasting control during low μ road running when the low μ road running recognition unit recognizes that the vehicle is running on a low μ road.

3 Claims, 6 Drawing Sheets

(51) Int. Cl.
*B60T 8/172* (2006.01)
*B60W 10/06* (2006.01)
*F02D 29/00* (2006.01)
*F16D 48/06* (2006.01)
*F16D 48/02* (2006.01)

(52) U.S. Cl.
CPC ............ *B60T2210/12* (2013.01); *B60W 10/02* (2013.01); *B60W 10/06* (2013.01); *B60W 2030/1809* (2013.01); *B60W 2510/0283* (2013.01); *B60W 2510/0604* (2013.01); *B60W 2540/106* (2013.01); *B60W 2550/148* (2013.01); *F02D 29/00* (2013.01); *F16D 48/066* (2013.01); *F16D 2048/023* (2013.01); *F16D 2048/0254* (2013.01); *F16D 2500/3114* (2013.01); *F16D 2500/3125* (2013.01); *F16D 2500/51* (2013.01); *F16D 2500/70424* (2013.01); *F16D 2500/7105* (2013.01); *B60W 2540/10* (2013.01)

(56) References Cited

U.S. PATENT DOCUMENTS 7,223,204 B2 * 5/2007 Steen et al. ............... 477/97
8,332,120 B2 * 12/2012 Bjernetun et al. ............ 701/93

FOREIGN PATENT DOCUMENTS

| JP | 10-288229 | 10/1998 | |
|----|-----------|---------|---|
| JP | 2001-304305 | 10/2001 | |
| JP | 2006-342832 | 12/2006 | |
| JP | 2010203544 A | * | 9/2010 |
| JP | 2010223345 A | * | 10/2010 |

OTHER PUBLICATIONS

Machine Translation: Yamamoto, Controller and Control Method for Running Body, Dec. 21, 2006, Japanese Patent Publication JP 2006342832 A.*
Machine Translation: Yamamoto, Coasting Control Device, Sep. 16, 2010, Japanese Patent Publication JP 2010203544 A.*
Machine Translation: Iwao et al., Coasting Control Device, Oct. 7, 2010, Japanese Patent Publication JP 2010223345 A.*
Written Opinion of the International Searching Authority mailed Oct. 18, 2011 in corresponding International Application No. PCT/JP2011/065564.
Patent Abstracts of Japan, Publication No. 03-200433, Published Sep. 2, 1991.
Patent Abstracts of Japan, Publication No. 08-067175, Published Mar. 12, 1996.
Patent Abstracts of Japan, Publication No. 10-288229, Published Oct. 27, 1998.
Patent Abstracts of Japan, Publication No. 2001-304305, Published Oct. 31, 2001.
Patent Abstracts of Japan, Publication No. 2006-342832, Published Dec. 21, 2006.
International Search Report of PCT/JP2011/065564 mailed Oct. 18, 2011.

* cited by examiner

COASTING CONTROL DEVICE

CROSS-REFERENCE TO RELATED APPLICATIONS

This application claims the foreign priority benefit of Japanese Application No. 2010-172561 filed Jul. 30, 2010, the contents of which are incorporated herein by reference, which serves as priority for PCT Application No. JP2011/065564 filed Jul. 7, 2011.

TECHNICAL FIELD

The present invention relates to a coasting control device that suppresses fuel consumption by disengaging a clutch during running and returning an engine to an idle state, and more particularly to a coasting control device capable of avoiding coasting control during running on low μ roads i.e., roads having a small coefficient of friction between a vehicle's tire and a surface of the road.

BACKGROUND ART

When the accelerator pedal of a vehicle is pressed while the clutch is disengaged, the accelerator is opened to cause the engine to run at "idle" and the engine RPM is stabilized at the engine RPM corresponding to the accelerator opening degree. At that point of time, the driving force generated by the engine and the internal resistance (friction) of the engine are in equilibrium and the engine output torque is 0. That is, the engine does no work for the outside the engine and fuel is wasted. Assuming that the engine runs at idle at the engine RPM of 2000 rpm, a driver can hear loud engine noise and recognize that a considerable amount of fuel is wasted.

The engine does no work for the outside not only during idling caused by disengagement of the clutch as described above but also while the vehicle is in motion. That is, the engine only revolves at an engine revolutions per minute ("RPM") corresponding to the accelerator opening degree as in idling and does not contribute to acceleration or deceleration of the vehicle. At this time, the fuel is consumed only in causing the engine to revolve uselessly, which is highly wasteful.

The present applicant has proposed a coasting control device that performs coasting control (also referred to as fuel cost running control) that disengages the clutch and places the engine in idle state to save fuel consumption while the engine is running but is doing no work for the outside the engine (Patent Literature 1).

CITATION LIST

Patent Literature

Patent Literature 1: Japanese Patent Laid-Open No. 2006-342832
Patent Literature 2: Japanese Patent Laid-Open No. 8-67175
Patent Literature 3: Japanese Patent Laid-Open No. 2001-304305

SUMMARY OF INVENTION

In addition to the above-described proposals, the applicant proposes a coasting control device which starts coasting control by disengaging the clutch and lowering the engine RPM by using a costing control determination map having a clutch rotation speed and an accelerator opening degree as indexes when plotted points of the clutch rotation speed and the accelerator opening degree are within a coasting control available region, an accelerator pedal operation speed is within a predetermined range, and plotted points of the clutch rotation speed and the accelerator opening degree pass a coasting control threshold line in a direction where the accelerator opening degree decreases and terminates coasting control when the accelerator pedal operation speed goes out of the predetermined range or the plotted points go out of the coasting control available region.

If a vehicle is running on low μ roads, coasting control is not preferable even if the conditions based on the coasting control determination map are met. That is because, instability of a vehicle behavior such as tire lock, slip and the like can easily occur in running on low μ roads and particularly lock can easily occur at a moment when the clutch is shifted from disengagement to engagement. In order to prevent such event, stabilization control such as ABS (Anti-Lock Braking System) control has been executed. That is, while such fine vehicle control is being executed, it is necessary to prepare such that a driving force of an engine or an engine brake can be used for stabilization of a vehicle behavior.

Thus, the present invention was made to solve the above-described problems and has an object to provide a coasting control device capable of avoiding coasting control during running on low μ roads.

In order to achieve the above-described object, the present invention is provided with a costing control execution unit that disengages a clutch in a driving situation in which the engine does no work for the outside and lowers the engine RPM so as to start coasting control, a low μ road running recognition unit that recognizes that the vehicle is running on a low μ road, and a unit for prohibiting coasting control during low μ road running that prohibits coasting control when the low μ road running recognition unit recognizes that the vehicle is running on a low μ road.

It may be so configured that a speed sensor that detects a rotation speed of a driving wheel and a rotation speed of a non-driving wheel is provided and the low μ road running recognition unit recognizes that the vehicle is running on a low μ road from a difference in rotation speed between the driving wheel and the non-driving wheel.

It may be so configured that an ABS control unit that detects a tire slip is provided and the low μ road running recognition unit recognizes that the vehicle is running on a low μ road from a slip signal outputted by the ABS control unit.

It may be so configured that a coasting control determination map to be referred to by the clutch rotation speed and the accelerator opening degree is provided and the coasting control execution unit starts coasting control when points of the clutch rotation speed and the accelerator opening degree plotted on the coasting control determination map are within a coasting control available region, an accelerator pedal operation speed is within a predetermined range, and plotted points of the clutch rotation speed and the accelerator opening degree pass a coasting control threshold line in a direction where the accelerator opening degree decreases and terminates coasting control when the accelerator pedal operation speed goes out of the predetermined range or the plotted points go out of the coasting control available region.

The present invention exerts the following excellent effect.

Coasting control during running on a low μ road can be avoided.

DETAILED DESCRIPTION

Preferred embodiments of the present invention will be described below on the basis of the attached drawings.

Figure 1:
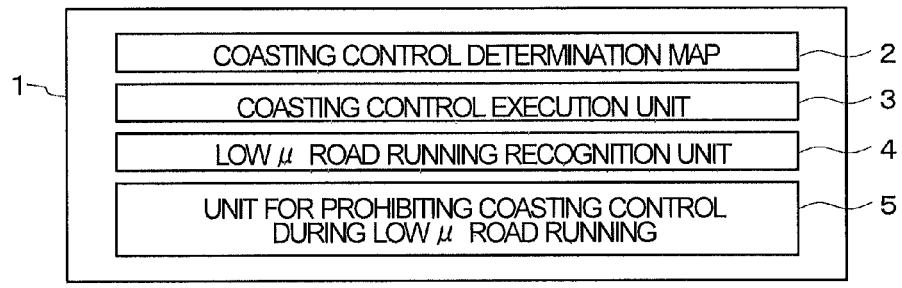
FIG. 1 is a block configuration diagram of a coasting control device of the present invention.

As illustrated in FIG. 1, a coasting control device 1 according to the present invention is provided with a coasting control execution unit 3 which disengages a clutch in a driving situation in which the engine does no work for the outside and lowers the engine RPM so as to start coasting control, a low μ road running recognition unit 4 which recognizes that a vehicle is running on a low μ road, and a unit 5 for prohibiting coasting control during low μ road running that prohibits coasting control when the low μ road running recognition unit recognizes that the vehicle is running on a low μ road.

In more detail, the coasting control device 1 is provided with a coasting control determination map 2 to be referred to by a clutch rotation speed and an accelerator opening degree, the coasting control execution unit 3 starts coasting control by disengaging the clutch and lowering the engine RPM when plotted points of the clutch rotation speed and the accelerator opening degree on the coasting control determination map 2 are within a region capable of coasting control, an accelerator pedal operation speed is within a predetermined range, and plotted points of the clutch rotation speed and the accelerator opening degree pass a coasting control threshold line in a direction where the accelerator opening degree decreases and terminates coasting control when the accelerator pedal opening speed goes out of the predetermined range or the plotted points go out of the region capable of coasting control.

The low μ road running recognition unit 4 is configured to read respective rotation speeds from speed sensors that detect the rotation speeds of a driving wheel and a non-driving wheel, not shown, respectively, and recognize that the vehicle is running on a low μ road from a difference in rotation speed between the driving wheel and the non-driving wheel.

An ABS control unit that detects a tire slip has been mounted on a vehicle, and the low μ road running recognition unit 4 may recognize that the vehicle is running on a low μ road from a slip signal outputted by the ABS control unit.

The coasting control determination map 2, the coasting control execution unit 3, the low μ road running recognition unit 4, and the unit 5 for prohibiting coasting control during low μ road running constituting the coasting control device 1 are preferably mounted on an ECU (not shown).

Each unit of a vehicle on which the coasting control device 1 of the present invention is mounted will be described.

Figure 2:
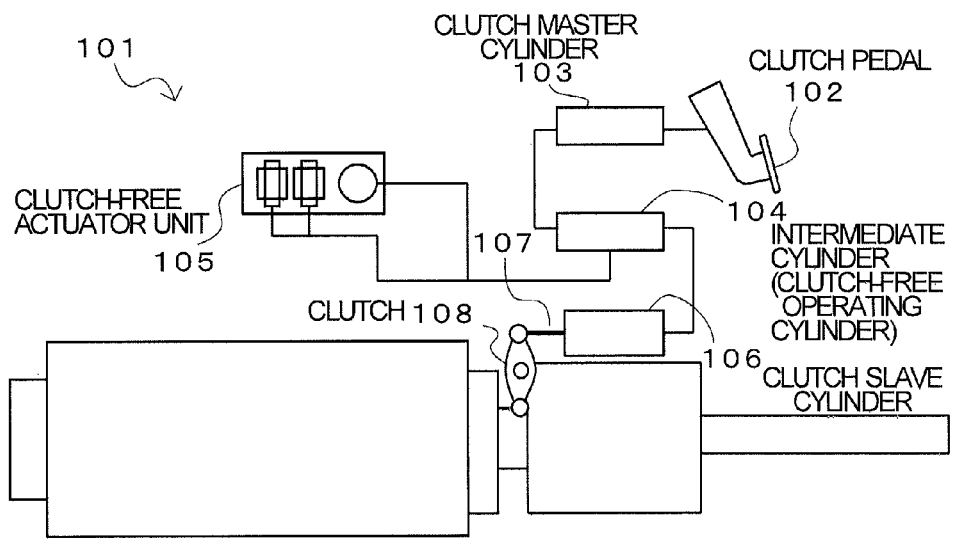
FIG. 2 is a block configuration diagram of a clutch system of a vehicle to which the coasting control device of the present invention is applied.

As illustrated in FIG. 2, a clutch system 101 of a vehicle on which the coasting control device 1 of the present invention is mounted is a manual and automatic dual-mode type controlled by the ECU. A clutch master cylinder 103 mechanically connected to a clutch pedal 102 supplies operation oil to an intermediate cylinder (also referred to as clutch-free operating cylinder and switching cylinder) in accordance with a stepping-in/returning operation of the clutch pedal 102 by a driver. On the other hand, a clutch-free actuator unit 105 controlled by the ECU (not shown) supplies operation oil to an intermediate cylinder 104 in accordance with an instruction of clutch engagement/disengagement. The intermediate cylinder 104 supplies operation oil to a clutch slave cylinder 106. A piston 107 of the clutch slave cylinder 106 is mechanically connected to a movable unit of a clutch 108.

Figure 3:
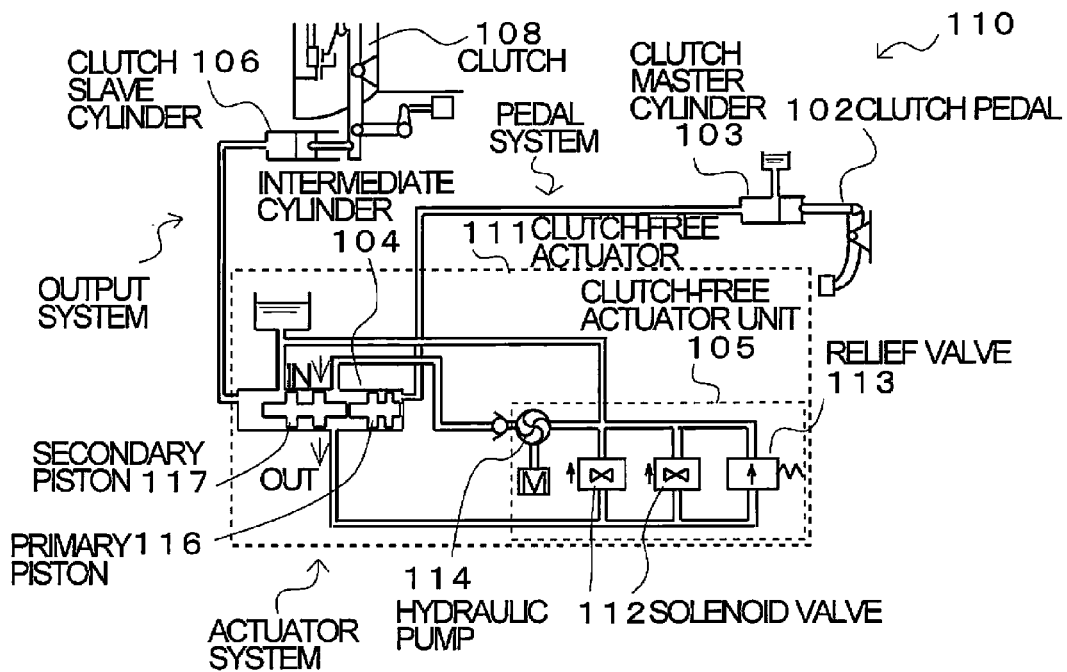
FIG. 3 is a configuration diagram of an actuator which realizes the clutch system in FIG. 2.

As illustrated in FIG. 3, the actuator 110 is provided with a clutch-free actuator 111. The clutch-free actuator 111 is provided with the intermediate cylinder 104 and the clutch-free actuator unit 105. The clutch-free actuator unit 105 is provided with a solenoid valve 112, a relief valve 113, and a hydraulic pump 114. The intermediate cylinder 104 is composed of a primary piston 116 and a secondary piston 117 arranged in series, and when the primary piston 116 strokes due to the operation oil from the clutch master cylinder 103, the secondary piston 117 is configured to stroke with that. The intermediate cylinder 104 is configured such that the secondary piston 117 strokes due to the operation oil form the clutch-free actuator unit 105. In accordance with the stroke of the secondary piston 117, operation oil is supplied to the clutch slave cylinder 106. With this configuration, when a manual operation is made, clutch engagement/disengagement according to the manual operation is performed with priority, and clutch engagement/disengagement according to the ECU control is performed when the manual operation is not being made.

The coasting control device 1 of the present invention can be applied also to a clutch system only with the automatic type and not having the manual type.

Figure 4:
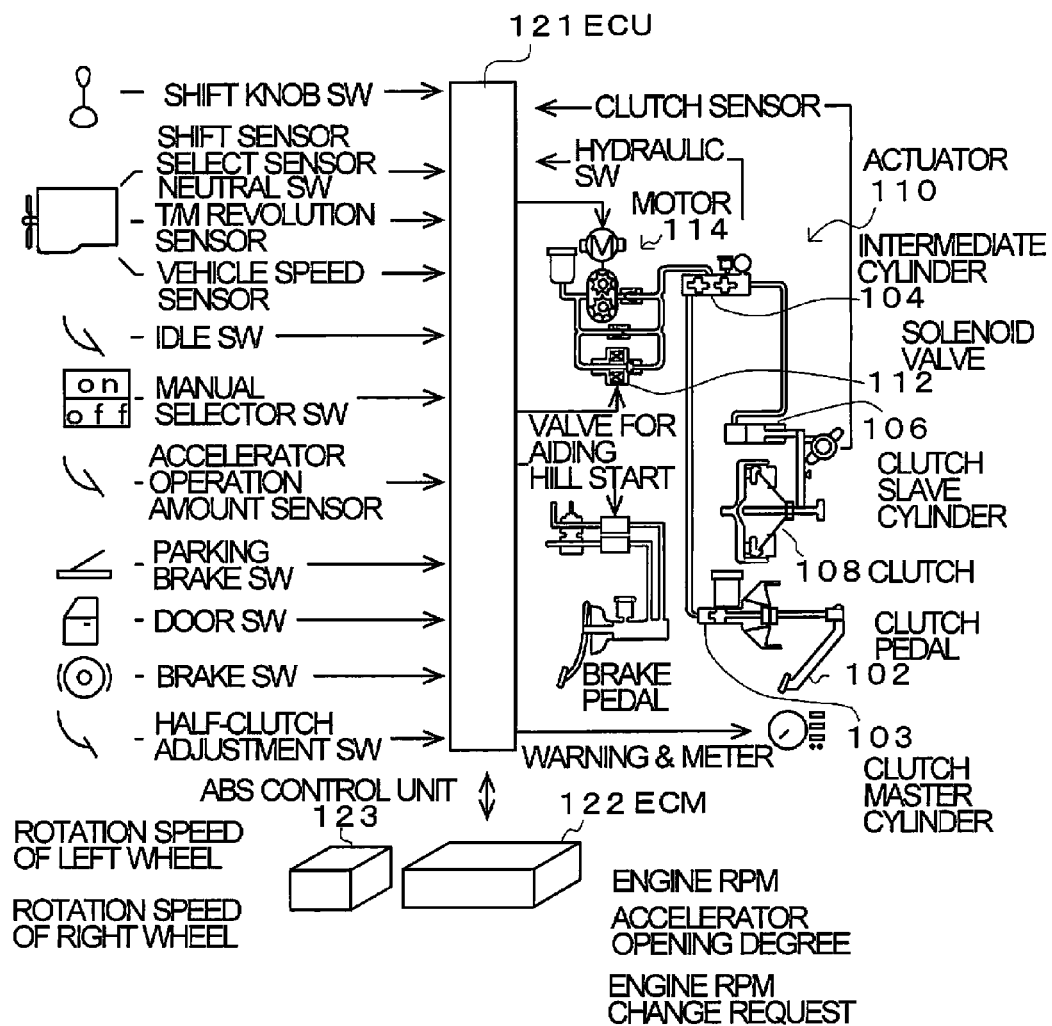
FIG. 4 is an input/output configuration diagram of a vehicle to which the coasting control device of the present invention is applied.

As illustrated in FIG. 4, in the vehicle, an ECU 121 which mainly controls a transmission/clutch, an engine control module ("EMC") 122 which mainly controls an engine, and an ABS control unit 123. To the ECU 121, input signal lines of a shift knob switch, a shift sensor of the transmission, a select sensor, a neutral switch, a transmission revolution sensor, a vehicle speed sensor, an idle switch, a manual selector switch, a parking brake switch, a door switch, a brake switch, a half-clutch adjustment switch, an accelerator operation amount sensor, a clutch sensor, and an oil pressure switch are connected. Moreover, to the ECU 121, output signal lines of a motor of the hydraulic pump 114 of the clutch system 101, the solenoid valve 112, a valve for aiding hill start, and warning & meter are connected. To the ECM 122, various input signal lines and output signal lines used for engine control, though not shown, are connected. The ECM 122 can transmit signals of an engine RPM, an accelerator opening degree, and an engine RPM change request to the ECU 121 through CAN (Controller Area Network) transmission path. The ABS control unit 123 is capable of detecting a tire slip from a rotation speed difference between the driving wheel and the non-driving wheel and sending slip signals to the ECU 121 through the CAN transmission lines.

The clutch rotation speed used in the present invention is the number of rotations of clutch on the driven side and is equal to the number of rotations of the input shaft of the transmission. The clutch rotation speed can be acquired from the number of input shaft rotations detected by an input shaft rotation number sensor, not shown. Alternatively, a clutch rotation speed can be acquired by using a gear ratio of the current gear position from a vehicle speed detected by the vehicle speed sensor. The clutch rotation speed indicates the engine RPM corresponding to the vehicle speed.

The vehicle speed sensor is configured to detect and to output the rotation speed of the driving wheel and the rotation speed of the non-driving wheel, respectively.

An operation of the coasting control device 1 of the present invention will be described below.

Figure 5:
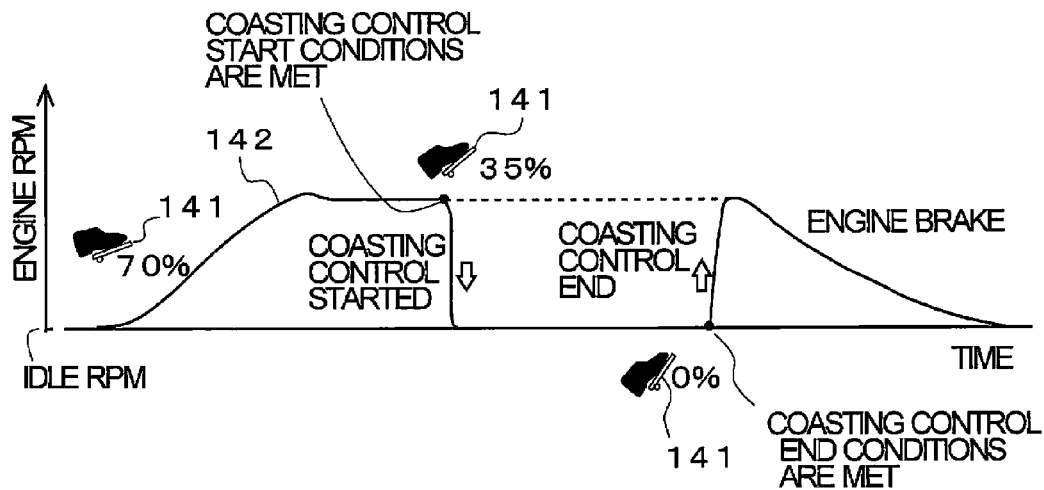
FIG. 5 is a conceptual operation diagram illustrating an overview of coasting control.

The operation principle of coasting control will be described with reference to FIG. 5. The horizontal axis represents time and a flow of control and the vertical axis represents the engine RPM. While an accelerator pedal 141 is largely pressed down from the idle rotation state and the accelerator opening degree stays at 70%, the engine RPM 142 increases to accelerate the vehicle. When the engine RPM 142 stabilizes and the amount of depression of the accelerator pedal 141 decreases to reduce the accelerator opening degree to 35%, conditions for starting coasting control, which will be described later, are considered to be satisfied. When coasting control is started, the clutch is disengaged and the engine RPM 142 is controlled to the idle RPM. The vehicle runs on coasting control. Assume that subsequently the accelerator pedal is released and the accelerator opening degree decreases to 0% or other conditions for terminating coasting control are satisfied. Upon termination of coasting control, the engine revolution is controlled and the clutch is engaged. Since the accelerator opening degree is 0% in this example, an engine braking state is entered to decelerate the vehicle.

If coasting control were not performed, the engine would be maintained at a high RPM as indicated by the dashed line during coasting control and fuel would be wasted accordingly. Coasting control reduces the engine RPM 142 to the idle RPM, thereby saving fuel.

Figure 6:
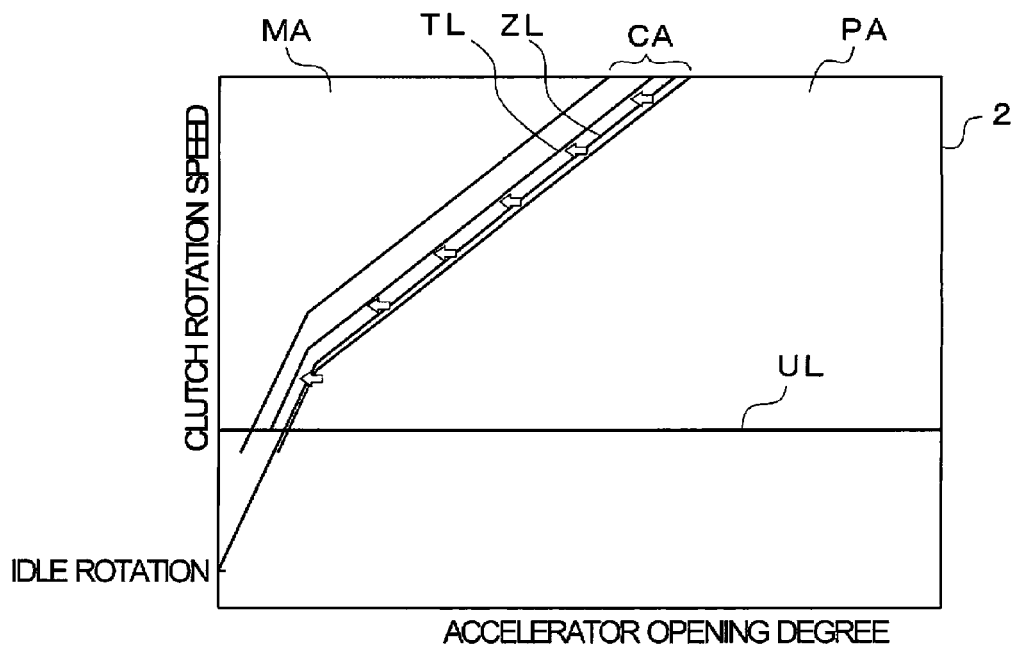
FIG. 6 is a graph image diagram of a coasting control determination map.

FIG. 6 illustrates a graph image of the coasting control determination map 2.

The coasting control determination map 2 is a map with the horizontal axis representing the accelerator opening degree and the vertical axis representing the clutch rotation speed. The coasting control determination map 2 can be divided into two regions: a negative region MA where the engine output torque is negative and a positive region PA where the engine output torque is positive. The negative region MA is a region where the engine output torque is negative because the friction of the engine is greater than a demanded engine torque. The positive region PA is a region where the engine output torque is positive because the demanded engine torque is greater than the friction of the engine. The engine output torque zero line ZL which is a boundary between the negative region MA and the positive region PA represents a state in which the engine is doing no work for the outside the engine and fuel is being wasted as described in the Background Art.

In the present embodiment, the coasting control threshold line TL is set slightly to the left of the engine output torque zero line ZL (on the side where the accelerator opening degree is small) on the coasting control determination map 2. A coasting control available region CA having a finite width including the coasting control threshold line TL is set between the negative region MA and the position region PA on the coasting control determination map 2. A clutch rotation speed lower threshold line UL is set on the coasting control determination map 2. The lower threshold line UL defines the lower threshold value of the clutch rotation speed independently of the accelerator opening degree. As illustrated, the lower threshold line UL is set slightly above the clutch rotation speed in the idle state.

The coasting control device 1 starts casting control when all of the following four coasting control start conditions are satisfied.

(1) The speed of operation of the accelerator pedal is within the thresholds.

(2) Plotted points of the clutch rotation speed and the accelerator opening degree pass the coasting control threshold line TL in the accelerator returning direction on the coasting control determination map 2.

(3) Points plotted on the coasting control determination map 2 are in the coasting control available region CA.

(4) The clutch rotation speed is above or on the lower threshold line UL on the coasting control determination map 2.

The coasting control device 1 ends coasting control when at least one of the following two coasting control end conditions is satisfied.

(1) The speed of operation of the accelerator pedal is out of the thresholds.

(2) Points plotted on the coasting control judgment map 2 are out of the coasting control available region CA.

The operation of the coasting control device 1 following the coasting control determination map 2, the coasting control start conditions, and the coasting control end conditions will be described.

The coasting control execution unit 3 monitors the accelerator opening degree on the basis of the accelerator pedal operation amount and the clutch rotation speed acquired from the input shaft rotation number or the vehicle speed all the time and plots coordinate points of the accelerator opening degree and the clutch rotation speed on the coasting control determination map 2 in FIG. 6. The coordinate points move with elapse of time. At this time, if the coordinate point is present in the coasting control available region CA, the coasting control execution unit 3 determines whether or not to start coasting control. If the coordinate point is not present in the coasting control available region CA, the coasting control execution unit 3 does not determine whether or not to start coasting control.

Subsequently, if the coordinate point passes the coasting control threshold line TL in a direction where the accelerator opening degree decreases, the coasting control execution unit 3 starts coasting control. That is, the coasting control device 1 disengages the clutch and controls the control accelerator opening degree that the ECM 122 instructs to the engine so as to correspond to idling. As a result, the clutch is disengaged, and the engine enters the idle state.

As a moving direction of the coordinate point is illustrated by an arrow in FIG. 6, the direction where the accelerator opening degree decreases is the left direction in the illustration. Even if the coordinate point passes the coasting control threshold line TL, if the moving direction of the coordinate point has a component of the right direction in the illustration, the accelerator opening degree increases and thus, the coasting control execution unit 3 does not start coasting control.

The coasting control execution unit 3 monitors the accelerator opening degree and the clutch rotation speed all the time even after the coasting control is started and plots the coordinate points of the accelerator opening degree and the clutch rotation speed on the coasting control determination map 2. If the coordinate point goes out of the coasting control available region CA, the coasting control execution unit 3 ends coasting control.

By the above-described operation, if the accelerator pedal is operated on the stepped-in side, even if the coordinate points of the accelerator opening degree and the clutch rotation speed pass the coasting control threshold line TL, coasting control is not started and only if the accelerator pedal is operated on the returning side, coasting control is started when the coordinate point passes the coasting control threshold line TL, and thus, the driver does not feel a sense of discomfort.

The coasting control execution unit 3 does not start coasting control if the coordinate point is present below the lower threshold line UL (the clutch rotation speed is lower than the lower threshold value). That is because even if the clutch is disengaged when the engine is in the idle state, an effect to suppress fuel consumption cannot be expected much. Thus, the coasting control execution unit 3 starts coasting control only when the coordinate point is present above the lower threshold line UL.

Figure 7:
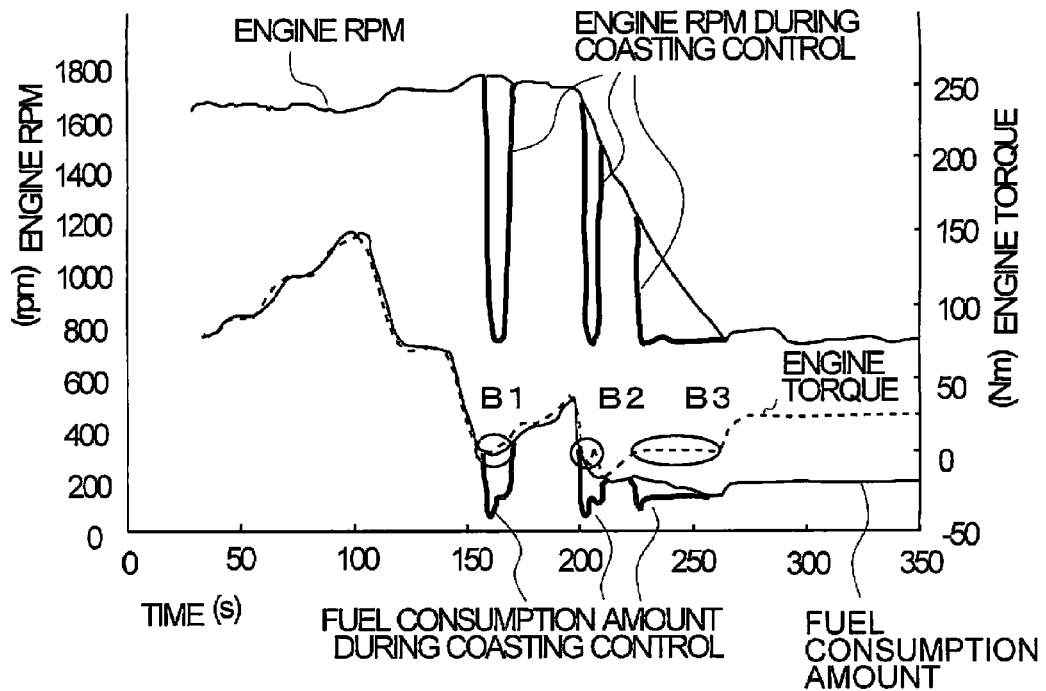
FIG. 7 is a graph illustrating a fuel saving effect of coasting control.

The effect of fuel cost reduction by coasting control will be described by referring to FIG. 7.

First, assume that coasting control is not to be executed. The engine RPM changes within a range of 1600 to 1700 rpm from approximately 30 s to approximately 200 s and lowers from approximately 1700 rpm to approximately 700 rpm (idle RPM) from approximately 200 s to approximately 260 s.

The engine torque increases from approximately 30 s to approximately 100 s but after that, it changes to decrease and continuously decreases until approximately 150 s. The engine torque is substantially 0 Nm from approximately 150 s to approximately 160 s and increases from approximately 160 s to approximately 200 s but becomes substantially 0 Nm at approximately 200 s. As a result, a period during which the engine torque is substantially 0 Nm occurs at three spots, that is, from approximately 150 s to approximately 160 s (oval B1), from approximately 200 s to approximately 210 s (oval B2), and from approximately 220 s to approximately 260 s (oval B3).

The fuel consumption amount (no vertical axis scale: arranged so as to overlap with the engine torque for convenience) changes substantially in compliance with the change of the engine torque from approximately 50 s to approximately 200 s. Even if the engine torque is substantially 0 Nm, the fuel consumption amount is not 0.

Here, if it is assumed that coasting control is executed, in the period during which the engine torque becomes substantially 0 Nm, the engine rpm is controlled to the idle RPM. In the graph, a line of the engine RPM (bold solid line) during coasting control is indicated as branching from a line of the engine RPM (solid line) when coasting control is not executed. The coating control was executed three times at the ovals B1, B2, and B3. The fuel consumption amount during the period when coasting control is executed falls under the fuel consumption amount when coasting control is not executed, and it is known that the fuel consumption is reduced.

Subsequently, a specific setting example of the coasting control determination map 2 will be described.

Figure 8:
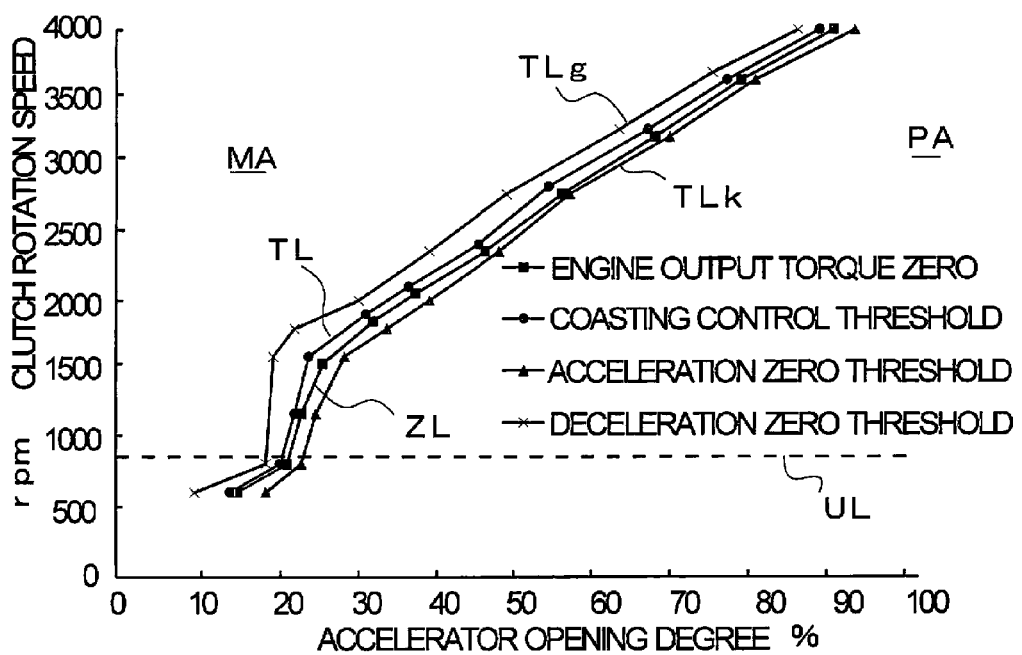
FIG. 8 is a graph illustrating actually measured accelerator opening degree and a clutch rotation speed in order to create the coasting control determination map.

As illustrated in FIG. 8, in order to create the coating control determination map 2, characteristics of the accelerator opening degree and the clutch rotation speed are actually measured, and a graph having the accelerator opening degree on the horizontal axis and the clutch rotation speed (=engine RPM; when the clutch is engaged) on the vertical axis is created. As a result, the actually measured engine output torque zero line ZL can be drawn. The entire left side from the engine output torque zero line ZL is the negative region MA, and the entire right side is the positive region PA.

The coasting control threshold line TL is defined and drawn slightly to the left of the engine output torque zero line ZL. A deceleration zero threshold line TLg is estimated and drawn slightly to the left of the coasting control threshold line TL. An acceleration zero threshold line TLk is estimated and drawn slightly to the right of the engine output torque zero line ZL. A region sandwiched by the deceleration zero threshold line TLg and the acceleration zero threshold line TLk is defined as the coasting control available region CA. The lower threshold line UL is set to 880 rpm in this example.

The deceleration zero threshold line TLg and the acceleration zero threshold line TLk are set to such a degree that the driver does not drive with difficulty, but since it is a matter of human senses and cannot be digitalized in design, it is tuned on an actual vehicle. The coasting control threshold line TL is set at the center between the deceleration zero threshold line TLg and the acceleration zero threshold line TLk.

The graph in FIG. 8 created as above is digitalized (discretized) as appropriate and written in a storage device, and the coasting control determination map 2 that can be used by the coasting control execution unit 3 for its calculation processing can be obtained.

Figure 9:
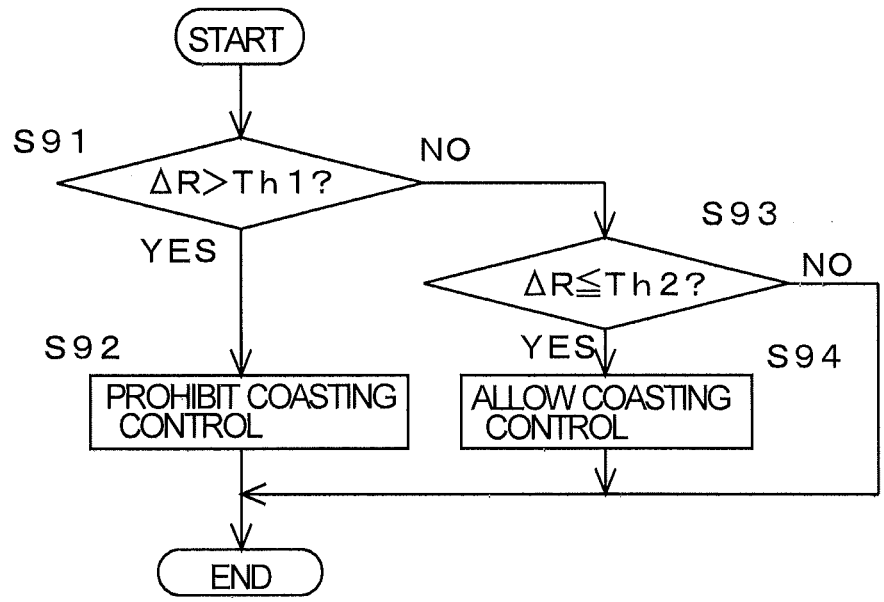
FIG. 9 is a flowchart illustrating procedures of low μ road running recognition and coasting control prohibition during running low μ road running in the coasting control device of the present invention.

Subsequently, a first embodiment of low $\mu$ road running recognition and coasting control prohibition during running on low $\mu$ roads in the coasting control device 1 of the present invention will be described by referring to FIG. 9.

In the first embodiment, it is assumed that the low $\mu$ road running recognition unit 4 recognizes that the vehicle is running on a low $\mu$ road from a difference in rotation speed between the driving wheel and the non-driving wheel. It is assumed that threshold values Th1 and Th2 (Th1>Th2) of the rotation speed difference acquired in advance in experiments are set in the low $\mu$ road running recognition unit 4.

At Step S91, the low $\mu$ road running recognition unit 4 reads the rotation speed of the driving wheel and the rotation speed of the non-driving wheel outputted by the vehicle speed sensors, calculates a rotation speed difference $\Delta R$ between the driving wheel and the non-driving wheel and determines whether or not the rotation speed difference $\Delta R$ exceeds the first threshold value Th1. If YES, since the rotation speed difference $\Delta R$ between the driving wheel and the non-driving wheel exceeds the first threshold value Th1, it can be recognized that the vehicle is running on a low $\mu$ road. In this case, the routine goes to Step S92. At Step S92, the unit 5 for prohibiting coasting control during low $\mu$ road running prohibits coasting control.

If it is NO in the determination at Step S91, the routine goes to Step S93. At step S93, the low $\mu$ road running recognition unit 4 determines whether or not the rotation speed difference $\Delta R$ is at the second threshold value Th2 (Th1=Th2+$\alpha$; $\alpha$ is a positive value set in advance on the basis of experiments) or less. If YES, since the rotation speed difference $\Delta R$ between the driving wheel and the non-driving wheel is at the second threshold value Th2 or less, it can be recognized that the vehicle is not running on a low $\mu$ road any more. In this case, the routine goes to Step S94. At Step S94, the unit 5 for prohibiting coasting control during low $\mu$ road running allows coasting control.

If it is NO in the determination at Step S93, the rotation speed difference $\Delta R$ is larger than the second threshold value Th2. If this determination is reached in a state where coasting control is allowed, it means that the rotation speed difference $\Delta R$ becomes the second threshold value Th2 or less once and coasting control is allowed and then, becomes larger than the second threshold value Th2, and thus, the routine proceeds to end in order to maintain allowed coasting control. If this determination is reached in a state where coasting control is prohibited, the rotation speed difference ΔR exceeds the first threshold value Th1 once and coasting control is prohibited and then, the rotation speed difference ΔR does not become the second threshold value Th2 or less yet, and thus, the routine proceeds to end in order to maintain prohibition of coasting control.

As a result, even if the coasting start conditions as described in FIG. 6 are met, coasting control is not started if the vehicle is running on a low μ road. On the other hand, if coasting control has been already executed, the clutch is disengaged and the driving wheel is not being driven and thus, the output of the vehicle speed sensor cannot be used for recognition of low μ road running. Thus, the recognition of low μ road running is made after coasting control is finished.

In this embodiment, it is configured such that the recognition of low μ road running is not made by comparison between the rotation speed difference ΔR and only one threshold value but when the rotation speed difference ΔR exceeds the first threshold value Th1, it is recognized that the vehicle is running on a low μ road and then, when the rotation speed difference becomes the second threshold value Th2, smaller than the first threshold value Th1, or less, it is recognized that the vehicle is not running on a low μ road any more, and thus, so-called hysteresis is realized, and hunting for that prohibition and allowing coasting control frequently is prevented.

Figure 10:
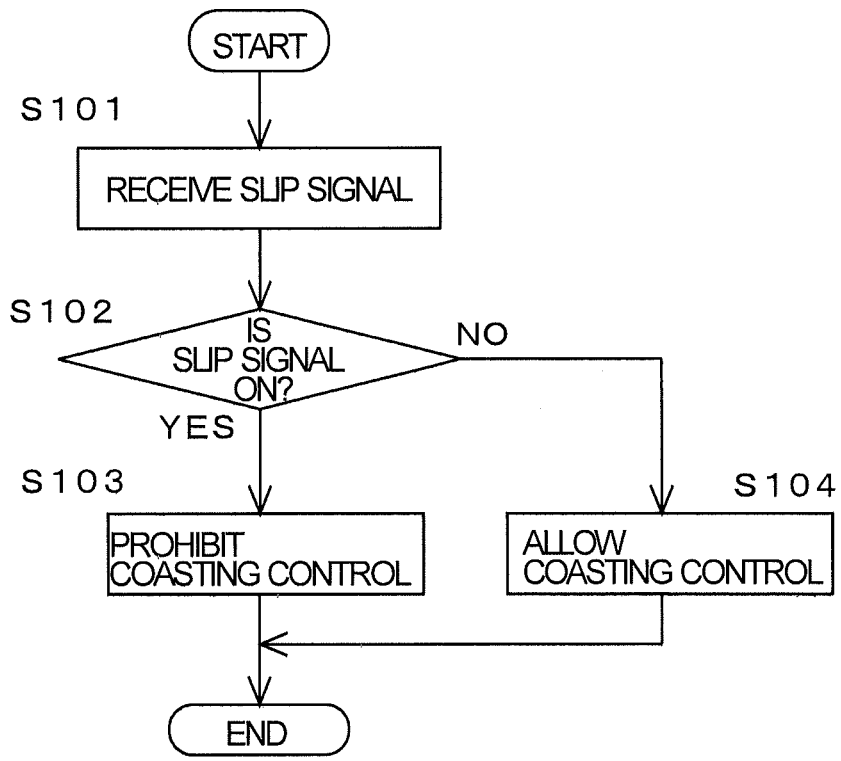
FIG. 10 is a flowchart illustrating the procedures of low μ road running recognition and coasting control prohibition during running on low μ roads in the coasting control device of the present invention.

Subsequently, a second embodiment of the low μ road running recognition and coasting control prohibition during low μ road running in the coasting control device 1 of the present invention will be described by referring to FIG. 10.

In the second embodiment, the recognition of low μ road is made by using a slip signal outputted by the ABS control unit upon detection of a tire slip.

At Step S101, the low μ road running recognition unit 4 receives a slip signal from the ABS control unit 123. Then, at Step S102, the low μ road running recognition unit 4 determines whether or not the slip signal is on (determined to be a slip). If YES, the routine goes to Step S103 and the unit 5 for prohibiting coasting control during low μ road running prohibits coasting control at Step S103. If NO in the determination at Step S102, the routine goes to Step S104 and the low μ road running recognition unit 4 allows coasting control at Step S104.

As described above, the coasting control device 1 of the present invention is configured such that coasting control is prohibited if it is recognized that the vehicle is running on a low μ road, and thus, coasting control does not coincide with or give a bad influence on stabilization control such as ABS control. Particularly, since lock can easily occur at the moment when the clutch is shifted from disengagement to engagement, prohibition of coasting control so that the clutch is not disengaged contributes to stabilization of the vehicle behavior.

According to the coasting control device 1 (second embodiment) of the present invention, since the ABS control unit 123 conventionally mounted on a vehicle determines a slip on the basis of the rotation speeds of the driving wheel and the non-driving wheel and outputs a slip signal, addition of a new sensor is not necessary by using this slip signal for recognition of the low μ road running.

According to the coasting control device 1 (first embodiment) of the present invention, since the low μ road running recognition unit 4 calculates the rotation speed difference ΔR between the driving wheel and the non-driving wheel separately from the ABS control unit 123, the threshold values Th1 and Th2 can be set arbitrarily based on the reference different from that of slip determination in the ABS control unit 123.

The invention claimed is:

1. A coasting control device for a vehicle comprising:
a coasting control execution unit that disengages a clutch in a driving situation in which an engine does no external work and lowers engine revolutions per minute so as to start coasting control;
a coasting control determination map including plotted points of a clutch rotation speed and an accelerator opening degree,
wherein the coasting control execution unit is configured to starts the coasting control when the plotted points of the clutch rotation speed and the accelerator opening degree on the map are within a region capable of coasting control, an accelerator pedal operation speed is within a predetermined range, and the plotted points of the clutch rotation speed and the accelerator opening degree pass a coasting control threshold line in a direction where the accelerator opening degree decreases, and
wherein the coasting control execution unit is configured to terminate the coasting control when the accelerator pedal operation speed goes out of the predetermined range or the plotted points go out of the region capable of the coasting control;
a low μ road running recognition unit that recognizes that the vehicle is running on a low μ road; and
a unit for prohibiting the coasting control by the coasting control execution unit during the low μ road running, when the low μ road running recognition unit recognizes that the vehicle is running on the low μ road.

2. The coasting control device according to claim 1, further comprising:
a speed sensor that detects a rotation speed of a driving wheel of the vehicle and a rotation speed of a non-driving wheel of the vehicle,
wherein the low μ road running recognition unit recognizes that the vehicle is running on the low μ road from a rotation speed difference between the driving wheel and the non-driving wheel.

3. The coasting control device according to claim 1, further comprising:
an ABS control unit that detects a tire slip,
wherein the low μ road running recognition unit recognizes that the vehicle is running on the low μ road from a slip signal outputted by the ABS control unit.

* * * * *